A. E. PAYETTE AND E. TETRAULT.
AUTOMOBILE SIGNAL.
APPLICATION FILED OCT. 8, 1920.
1,374,861.
Patented Apr. 12, 1921.
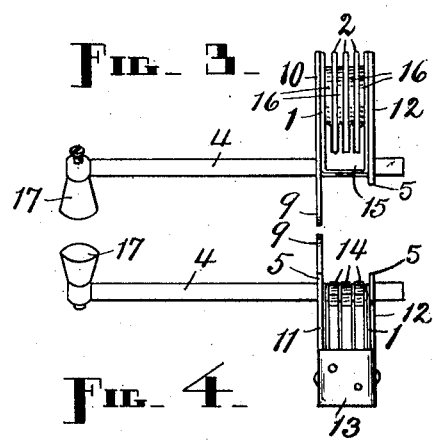
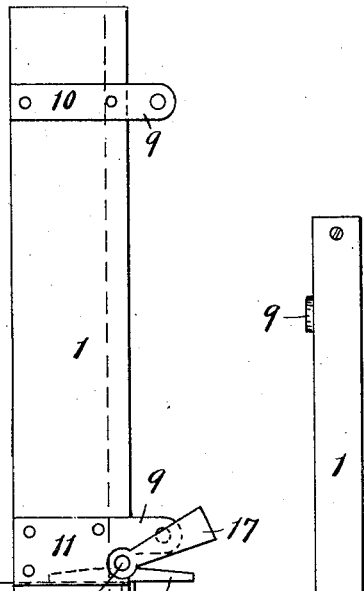
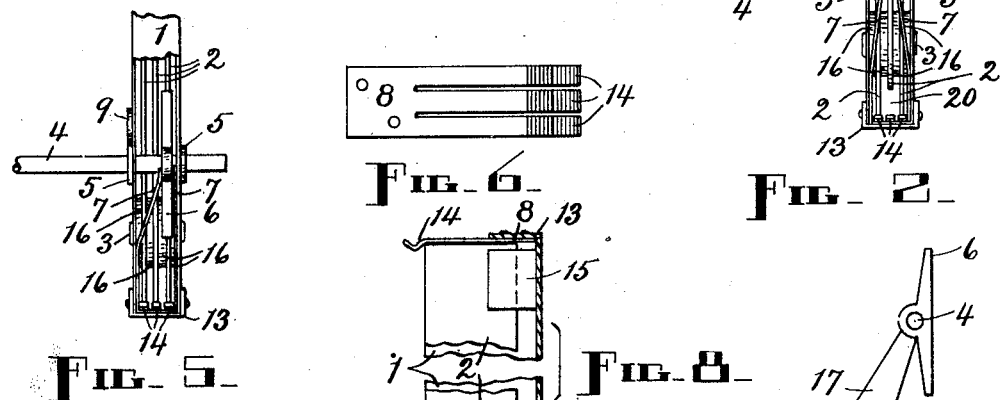
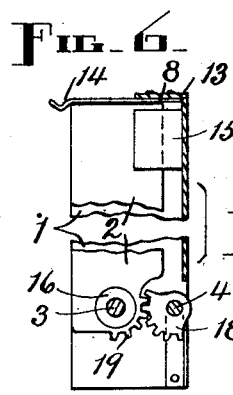
WITNESS:
A. C. Fairbanks,
INVENTOR.
Albert E. Payette,
Eusebe Tetrault,
BY Frank A. Cutter,
ATTORNEY.

UNITED STATES PATENT OFFICE.

ALBERT E. PAYETTE AND EUSEBE TETRAULT, OF SPRINGFIELD, MASSACHUSETTS.

AUTOMOBILE-SIGNAL.

1,374,861.  Specification of Letters Patent.  Patented Apr. 12, 1921.

Application filed October 8, 1920. Serial No. 415,616.

*To all whom it may concern:*

Be it known that we, ALBERT E. PAYETTE, a subject of the King of England, residing at Springfield, in the county of Hampden and State of Massachusetts, and EUSEBE TETRAULT, a citizen of the United States of America, and a resident of said Springfield, Massachusetts, have invented a new and useful Automobile-Signal, of which the following is a specification.

Our invention relates to devices attachable to automobiles and similar vehicles, which are designed to give traffic signals, or to indicate the direction that the vehicle is about to take or the fact that the vehicle is about to stop, and consists in general of a suitable casing or sheath that is adapted to be attached to some part of the wind-shield or other supporting member of the vehicle, a plurality of semaphore arms carried by and normally concealed in said sheath, but adapted to be actuated into exposed position, and spring-pressed, slidingly-adjustable, operating means for said arms, together with such other parts and members as may be necessary or desirable in order to render the device complete, all as hereinafter set forth.

The primary object of our invention is to provide a device, of the class specified above, which is simple in construction and operation, easily attachable to the side of a windshield or other supporting part of a vehicle, can be easily operated from the driver's seat for the purpose of signaling to indicate the direction which the vehicle is about to take, or the fact that the vehicle is about to be brought to a stand-still, or of communicating information of a more or less similar nature, according to the character of the indices with which the device is provided, and consists of few parts that are not liable to get out of order or become inoperative from ordinary usage.

Other objects and advantages will appear in the course of the following description.

We attain the objects and secure the advantages of our invention by the means illustrated in the accompanying drawings, in which—

Figure 1 is an elevation of what may be termed the inner side, that is, the side nearer the operator on the driver's seat of a vehicle equipped with such a device, of an automobile signal which embodies a practical form of our invention, one of the semaphore arms being extended in exposed or operative or active position; Fig. 2, an edge elevation of said signal as viewed from the right-hand of the preceding view; Fig. 3, a top plan of said signal, all of the arms in this and the next view being completely within the sheath in inactive position; Fig. 4, a bottom plan of the signal; Fig. 5, a sectional view of the lower portion of the device as seen from the right-hand side of Fig. 1, and showing the operating means for the semaphore arms located in operative position relative to a different arm from that with which such means is in operative relation normally, and as in the preceding views; Fig. 6, an enlarged bottom plan of the retaining spring for said arms; Fig. 7, an end elevation of the operating spindle with the operating arm attached thereto, and, Fig. 8, a side elevation of the end portions of an automobile signal which is slightly modified from that shown in the other views, the middle portion of the modified signal being broken out to economize space, and the near side of the sheath being removed in order to disclose fully the operating parts within said sheath, and the pivot and operating spindle being in cross-section, in this last view.

Similar characters of reference designate similar parts throughout the several views.

The signal device shown in the first five views comprises a casing or sheath 1, three semaphore arms 2 pivotally attached to or connected with said sheath at 3, an operating spindle 4 journaled in lugs 5—5 with which the sheath is provided, an operating arm 6 which is mounted on and rigidly attached to said spindle and extends in opposite directions therefrom, a pair of springs 7, and a spring 8.

The sheath 1 is closed on the front or outer and back or inner sides, and on one edge except at and adjacent to the bottom thereof where said sheath is open, and the latter is also open at the opposite edge. The sheath 1 is designed to be attached to a vehicle at the left-hand side thereof, and to this end is provided with lugs 9—9, although some other suitable attaching means might be provided and employed. The lugs 9 project beyond what may be termed the inner edge of the sheath 1, since that is the edge which is adjacent to the central, longitudinal, vertical plane of the vehicle, and is the closed edge, that is, it is closed except at the bottom part, as represented at 20, in Fig. 2. (The edge of the casing 1 which is open throughout its entire length is, therefore, the outer edge, being that which is adjacent to the left-hand side of the vehicle or in correspondence with such side.) The lugs 9 are integral parts of upper and under plates 10 and 11, respectively, that are securely attached to the inner side of the sheath 1, which is the side nearer the driver of the automobile as previously observed. One of the lugs 5 is integral with the plate 11, while the other lug 5 is integral with a plate 12 which is attached to the outer side of the sheath 1. The lugs 5 form bearings for the spindle 4, and the latter is journaled and adapted to be reciprocated and rotated therein.

A bridge-piece 13 is securely attached to the inner and outer sides of the casing 1 at the bottom, extending across a portion of the open space at such bottom, and the outer end of the spring 8 is rigidly attached to said bridge-piece. The spring 8 is divided to form three resilient fingers 14, and these extend inwardly from the bridge-piece 13 beneath the open bottom of the sheath, and with said bridge-piece practically close such bottom.

At the top of the sheath 1 is a spacer 15 which has three vertical slots in the side thereof that is adjacent to the outer, open edge of said sheath, to receive the upper terminals of the semaphore arms 2 when the latter are in their upright, inactive position, and properly space and securely support such terminals.

Each semaphore arm 2 is adapted to be entirely inclosed within the sheath 3, when said arm is in an upright position, to be actuated outwardly and downwardly into a horizontal position, whereby all but a comparatively small portion thereof is exposed outside of the sheath, and to be returned to inactive position wholly within the sheath. The bottom or inner terminals of the arms 2 are mounted on the pivot 3, which latter is mounted in the inner and outer sides of the casing 1. Four washers or spacers 16 are provided, on the pivot 3, between the arms 3 and between such arms and the inner and outer sides of the casing 1, to separate the parts and assist in retaining them in proper spaced relationship. The sheath 1 is cut away at 20 to afford room for the bottom or inner terminals of the arms 2, when said arms are actuated into and out of active position. The springs 7 also are partly located in the opening 20. The springs 7 are arranged longitudinally within the sheath 1, and are rigidly attached at their bases to the outer and inner sides of said sheath. The upper terminals of the springs 7 embrace the operating arm 6 or the hub thereof, and normally retain said arm in the center of the space between the outer and inner sides of the sheath 1, with said arm in engaging relationship to the central semaphore arm 2. Either spring 7 is adapted, however, to yield under pressure exerted thereon by the arm 6, when and accordingly as the spindle 4 is actuated outwardly or inwardly for the purpose of locating said arm 6 in operative position relative to either the innermost or outermost arm 2, so as to permit such adjustment to be made.

The relative positions of the pivot 3 and spindle 4 and the proportions of the parts are such that the operating arm 6 can engage the inner or top edge of any of the semaphore arms 2, according to the position of such arm, and such engagement is on both sides of a transverse line passing through said pivot and being at right-angles to such edge. It follows, then, that the act of rocking the arm 6 in one direction causes the engaged arm 2 to be swung on the pivot 3 in the same direction, and the act of rocking said first-named arm in the opposite direction causes said second-named arm to be swung in the opposite direction also. The inner or bottom edge of the arm 6, according to the position of said arm, is in contact with the contiguous edge of the arm 2 which is engaged by said arm 6.

As previously observed, the operating arm 6 is located normally in operative position relative to the intermediate semaphore arm 2. Obviously, therefore, if the spindle 4 be partially rotated in the bearings 5 to the left by the operator, the intermediate arm 2, which is the one engaged by the arm 6, is actuated, through the medium of said arm 6, from its vertical to its horizontal position, as shown in Figs. 1 and 2, assuming that said arm 2 were originally standing vertically. If the spindle 4 now be actuated to the right, it carries with it the arm 6, and the latter bearing on the heel of the horizontally-disposed arm 2 rocks the latter on the pivot 3 upwardly into initial, inactive position in the sheath 1.

If it be desired to actuate the innermost semaphore arm 2 out of the sheath into exposed, active position, the spindle 4 is drawn inwardly in the bearings 5, by the operator, or drawn toward the operator, against the resiliency of the spring 7 on that side of the operating arm 6, and said arm is thus located in position to act on said operating arm 2. Now, upon turning or partially turning the spindle 4 to the left in its bearings, the innermost arm 2 is rocked on the pivot 3 from the inclosed position into the exposed position outside of the sheath, through the medium of the arm 6 as always. The semaphore arm in question is returned to inactive position again by drawing the spindle 4 toward the operator as before, and partially rotating said spindle to the right. This innermost arm 2 is that which is nearest to the operator.

In order to expose the outermost semaphore arm 2, which is the arm that is the most remote from the operator, the spindle 4 is pushed outwardly by the operator against the resiliency of the spring 7 on that side, to position the operating arm 6 in engaging relationship with said outermost semaphore arm, and then the latter is operated through the medium of said operating arm and said spindle in the same manner as are the other arms. The outermost semaphore arm 2 is returned wholly to the sheath 1 by again forcing the spindle 4 outwardly and then partially rotating the same to the right.

Whenever the spindle 4 is released, after having been actuated longitudinally in either direction against the force of either of the springs 7, the spring which yielded under the pressure from the arm 6 immediately acts to cause said spindle to be moved in the direction necessary to dispose said arm in normal position in engaging relationship to the intermediate arm 2.

The spring fingers 14 bear on the heels of the semaphore arms 2 when said arms are in upright position, and normally retain such arms in such position, it being necessary, whenever one of said arms is actuated by the spindle 4 and the arm 6 into exposed position, to exert force enough to overcome the finger 14 which is bearing on the actuated arm 2. On the return of any arm 2 to inactive position in the sheath 1, such arm or the heel thereof snaps into engagement with its finger 14, and the arm is held by said finger. At such time the upper terminal of the semaphore arm enters the slot therefor in the spacer 15, and is properly positioned and supported by said spacer.

The intermediate semaphore arm 2 should have the word Stop on the inner (or back) side thereof, and may have either the same word or the word Straight on the outer (or front) side thereof, while one of the other semaphore arms 2 has the word Left on one or preferably both sides thereof, and the third semaphore arm 2 has the word Right on one or preferably both sides thereof. In order, therefore to indicate that he is about to stop, the operator simply need turn the spindle 4 to the left without moving said spindle in either direction longitudinally, when the Stop semaphore is actuated by the operating arm 6 into exposed position. If the operator be about to turn to the right, and it be assumed that the outermost semaphore arm 2 bears the word Right thereon, the operator forces the spindle 4 outwardly and actuates said semaphore arm into active position. On the other hand, if it be desired to turn to the left, and it be assumed that the innermost semaphore arm 2 bears the word Left thereon, the operator draws the spindle 4 toward him and actuates said semaphore arm into exposed position. Any semaphore arm, after having been displaced or rather actuated into exposed position, should, of course, be thrown upwardly into the sheath 1 as soon as the need for the exposure of the same is passed.

Any other desired or suitable words may be used on the arms 2, or some other form of indices may be substituted for the words or used in connection with them. The arrangement of the words as indicating elements on the arms 2 relatively may also be changed.

The operating spindle 4 is provided at the inner end with an operating handle 17.

In place of the operating arm 6 on the spindle 4 we may employ a segmental-gear 18, and provide the heel of each semaphore 2 with a segmental-gear 19 with which said first-named segmental-gear intermeshed—see Fig. 8. In this last construction it is necessary to locate the spindle 4 in approximately the same horizontal plane with that of the pivot 3, said spindle in the first case being some distance above the horizontal plane of said pivot, and to remove the bridge-piece 13 and the spring 8 from the bottom of the sheath 1 and place such members at the top of said sheath. A spring 7 is employed here, as before, on each side of the semaphore-arm-actuating member, which is the segmental-gear 18, to retain the same normally in engagement with the intermediate semaphore arm. The operation of the semaphore arms and their manner of operation are substantially the same in the last as in the first case, except that in the last case the direction of rotation of the spindle 4 is the reverse of the direction of such spindle in the first case, in producing any given movement of the semaphore arms, which is due to the substitution of the intermeshing toothed members for the operating arm 6.

More or less change in the size, shape, construction, and arrangement of some or all of the parts of this device, in addition to such changes as have been specifically pointed out herein, may be made without departing from the spirit of our invention or exceeding the scope of what is claimed.

What we claim as our invention, and desire to secure by Letters Patent, is—

1. The combination, in an automobile signal, with a sheath, and a plurality of semaphore arms pivotally connected at one terminal with said sheath, of rotatable and londitudinally-movable means for operating said arms individually, according to the position of said means relative to said arms.

2. The combination, in an automobile signal, with a sheath, and semaphore arms pivotally connected at one terminal with said sheath, of rotatable and longitudinally-movable means for operating said arms individually, and resilient means normally to retain said first-named means in position to engage the intermediate arm.

3. The combination, in an automobile signal, with a sheath provided with bearings, and semaphore arms pivotally connected at one terminal with said sheath, of an operating spindle supported in said bearings and adapted to be rotated and actuated longitudinally therein, said spindle being provided with an engaging member for said arms.

4. The combination, in an automobile signal, with a sheath provided with bearings, and semaphore arms pivotally connected at one terminal with said sheath, of an operating spindle supported in said bearings and adapted to be rotated and moved longitudinally therein, and provided with an operating member for said arms individually, and springs arranged in said sheath and bearing on said member in a manner normally to retain the same in position for engagement with the intermediate arm.

5. The combination, in an automobile signal, with a sheath provided with bearings, and semaphore arms pivotally connected at one terminal with said sheath, of an operating spindle supported in said bearings and adapted to be rotated and moved longitudinally therein, an operating arm secured to said spindle in position to bear on any of said semaphore arms on either side of the plane of their axes which is at right-angles to the plane of said axes that is longitudinal of said semaphore arms.

6. The combination, in an automobile signal, with a sheath provided with bearings, and semaphore arms pivotally connected at one terminal with said sheath, of an operating spindle supported in said bearings and rotatably and longitudinally movable therein, an operating arm secured to said spindle in position to engage any of said semaphore arms on either side of the plane of their axes which is at right-angles to the plane of said axes that is longitudinal of said semaphore arms, and springs attached to said sheath and arranged to bear on opposite sides of said operating arm, for the purpose of retaining the latter in engaging position relative to the intermediate semaphore arm, but adapted to yield and permit said operating arm to be positioned in engaging relation to either of the other semaphore arms.

7. The combination, in an automobile signal, with a sheath, a plurality of semaphore arms pivotally connected at one terminal with said sheath, and resilient means carried by said sheath and adapted normally to retain said arms in inclosed position within said sheath, of means to actuate said arms individually against the force of said resilient means into exposed position.

8. The combination, in an automobile signal, with a sheath provided with a spacer, and with resilient means, and semaphore arms pivotally connected at one terminal with said sheath, said arms being held in position within said sheath, when withdrawn from view, by said resilient means and said spacer, of operating means for said semaphore arms, whereby the same may be individually actuated against the force of said resilient means into exposed position.

9. The combination, in an automobile signal, with a sheath provided with bearings, and semaphore arms pivotally connected at one terminal with said sheath, and receivable fully within the same, said sheath being further provided with resilient means normally to retain said arms fully within said sheath, of an operating spindle supported in said bearings and adapted to be rotated and reciprocated therein, and an operating arm secured to said spindle and extending in both directions therefrom to engage the adjacent edge of any of said semaphore arms, on both sides of the transverse plane passing through the pivotal center of said semaphore arm perpendicular to such edge, whereby the semaphore arm may be actuated, against the force of said resilient means, into exposed position, and actuated out of such position into inactive position, according to the direction in which said spindle is rotated.

10. The combination, in an automobile signal, with a sheath provided with bearings, and semaphore arms pivotally connected at one terminal with said sheath, and receivable fully within the same, said sheath being further provided with resilient means normally to retain said arms fully within said sheath, of an operating arm supported in said bearings and adapted to be rotated and reciprocated therein, an operating arm secured to said spindle and extending in both directions therefrom to engage the adjacent edge of any of said semaphore arms, on both sides of the transverse plane passing through the pivotal center of said semaphore arm perpendicular to such edge, whereby the semaphore arm may be actuated, against the force of said resilient means, into exposed position, and actuated out of such position into inactive position, according to the direction in which said spindle is rotated, and springs arranged in said sheath to locate said operating arm normally in operative position relative to the intermediate semaphore arm.

ALBERT E. PAYETTE.
EUSEBE TETRAULT.

Witnesses:
A. C. FAIRBANKS,
F. A. CUTTER.